US007398234B1

United States Patent
Theis et al.

(10) Patent No.: US 7,398,234 B1
(45) Date of Patent: Jul. 8, 2008

(54) METHOD AND SYSTEM FOR ORGANIZING VENDOR INFORMATION

(75) Inventors: Lisa M. Theis, Austin, TX (US); Michael L. Pope, Milton Keynes (GB)

(73) Assignee: Electronic Data Systems Corporation, Plano, TX (US)

( * ) Notice: Subject to any disclaimer, the term of this patent is extended or adjusted under 35 U.S.C. 154(b) by 1825 days.

(21) Appl. No.: 09/696,806

(22) Filed: Oct. 25, 2000

Related U.S. Application Data (60) Provisional application No. 60/201,081, filed on Apr. 28, 2000.

(51) Int. Cl.
G07B 17/00 (2006.01)
G07F 19/00 (2006.01)

(52) U.S. Cl. .............................. 705/30; 705/28; 705/34; 707/7

(58) Field of Classification Search .................... 705/30, 705/32, 33, 34, 26; 707/7, 4
See application file for complete search history.

(56) References Cited

U.S. PATENT DOCUMENTS 4,851,999 A * 7/1989 Moriyama .................. 364/401
5,926,810 A * 7/1999 Noble et al. .................... 707/4
5,970,475 A * 10/1999 Barnes et al. ................. 705/27
6,026,392 A * 2/2000 Kouchi et al. .................. 707/2
6,058,380 A * 5/2000 Anderson et al. ............. 705/40

FOREIGN PATENT DOCUMENTS

JP 06-325059 11/1994

OTHER PUBLICATIONS

"Purchasing cards: a low-value procurement panacea?", Treasury Manager's Report, vol. 2, No. 22, Oct. 28, 1994.*
Holland, K. and Bongiorno, L., "Armored and Dangerous: Did bank insiders help revere take clients for a ride?", Business Week, Oct. 4, 1993.*

* cited by examiner

Primary Examiner—F. Zeender
Assistant Examiner—Christopher Buchanan
(74) Attorney, Agent, or Firm—Baker Botts L.L.P.

(57) ABSTRACT

A plurality of accounts payable items (14) are communicated over communications links (24) to a global purchasing information repository (GPIR) (12) by account servers (19) and regional servers (18). A preparation application (16) unifies the representation of the items and a GPIR application (20) associates categories (54) and buyer identifiers (56) with the items based on criteria (70). A vendor alignment tool module (23) associates vendor identifiers (58) with vendor names (34) associated with the items and with the items. The module also associates vendor groups (62) with the vendor identifiers based on relationships between the vendor identifiers. A plurality of reports (74) may be generated in response to the identifiers, groups and categories to provide information to a business regarding global expenditures and vendor relationships.

18 Claims, 5 Drawing Sheets

METHOD AND SYSTEM FOR ORGANIZING VENDOR INFORMATION

RELATED APPLICATIONS

This application claims the benefit of U.S. Provisional Application Ser. No. 60/201,081 entitled "Method and System for Tracking Global Purchasing Information" filed Apr. 28, 2000.

This application is related to co-pending U.S. patent application Ser. No. 09/696,767, filed on Oct. 25, 2000 by Shaun L. Alsobrook, et al., and entitled, "Method and System for Tracking Global Purchasing Information".

TECHNICAL FIELD OF THE INVENTION

This invention relates generally to financial information processing and, more particularly, to a method and system for organizing vendor information.

BACKGROUND OF THE INVENTION

As computers have become more important in today's society, many organizations use computerized accounts payable systems for increased efficiency and decreased cost. However, for large organizations, existing accounts payable systems have provided minimal business intelligence regarding expenditures on an organization-wide basis. Thus, it is difficult for a large organization to track how much it spends with a particular vendor or for particular classes of goods and services. The problem is magnified when the organization is multinational as different currencies may be used for payment and different accounts payable software may be used. Large organizations often try to decrease the cost of goods and services they purchase, but often lack the business intelligence regarding global expenditures by the organization that may be helpful in large scale cost cutting programs.

In addition, while accounts payable systems may provide some information about particular vendors, information about related vendors is minimal. More specifically, existing accounts payable systems typically lack flexible tools for organizing the vendors from whom items are purchased. Where multiple vendors are related to one another, existing systems do not provide the flexibility to view expenditures for multiple vendors grouped together.

SUMMARY OF THE INVENTION

One aspect of the invention is a method for organizing vendor information comprising receiving data comprising a plurality of accounts payable items. Each accounts payable item has an associated vendor name and the vendor name represents a business associated with a purchase transaction represented by the accounts payable item. Ones of the accounts payable items are associated with a first vendor name. The method further comprises associating a first vendor identifier and a second vendor identifier using a computer with ones of the accounts payable items associated with the first vendor name.

The present invention provides important technical advantages. Various embodiments of the invention may have none, some, or all of these advantages. The invention allows accounts payable items to be organized and reports to be generated in response to any of the purchaser of the item, the vendor from whom the item is purchased, a category and sub-category associated with the item, by groupings of the purchasers of the item and by groupings of the vendors of the item. The invention also allows relationships to be defined between owners and subsidiaries of the vendors and between the purchasers of the items.

BRIEF DESCRIPTION OF THE DRAWINGS

A better understanding of the present invention will be realized from the detailed description that follows, taken in conjunction with the accompanying drawings, in which.

DETAILED DESCRIPTION OF THE DRAWINGS

The preferred embodiment of the present invention and its advantages are best understood by referring to FIGS. 1-6 of the drawings, like numerals being used for like and corresponding parts of the various drawings.

Figure 1:
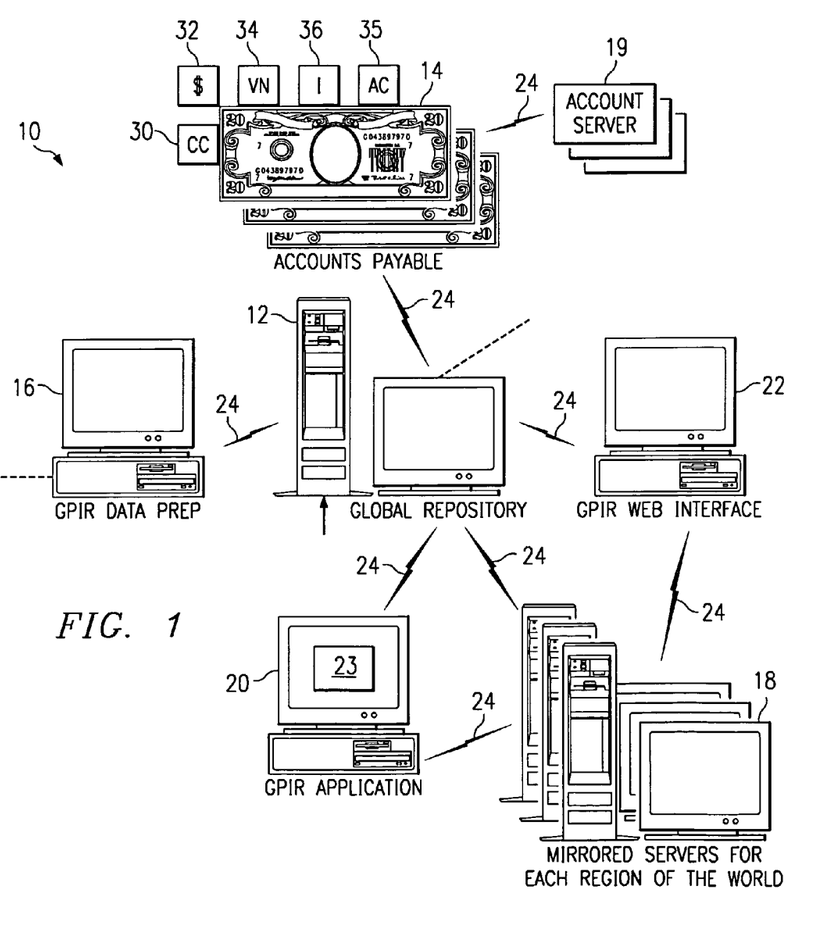
FIG. 1 illustrates one embodiment of a global purchasing information system constructed according to the present invention.

FIG. 1 is a block diagram illustrating an example of a global purchasing information system 10. System 10 comprises a global purchasing information repository (GPIR) 12 operable to receive a plurality of accounts payable data items 14 and to communicate with a data preparation application 16, a plurality of regional servers 18, one or more account servers 19, a GPIR application 20 and an interface 22 linked to communication links 24. Some of these components could be omitted or other components added to complement the functions described below without departing from the scope of the invention.

GPIR 12 comprises any suitable combination of hardware and software operable to provide database functionality. GPIR 12 stores accounts payable data items 14 for use by data preparation application 16, servers 18, GPIR application 20 and interface 22. In one embodiment, GPIR 12 comprises an Oracle database executing on a server computer. However, any type of database may be used such as a relational, object, or hierarchical database without departing from the scope of the invention. Note that GPIR 12 can also be implemented as a distributed system without departing from the scope of the invention.

Each accounts payable data item 14 may comprise accounts payable information indicating one or more purchased items, a cost 32 for the item in a local currency, a cost center 30 within an organization that purchased the items, a vendor name 34 to whom the amount is owed, a date of payment (not explicitly shown), an account 35 and an item description 36. Multiple items 14 may be generated to represent individual line items from purchase orders with multiple distinct line items. Items 14 are associated with goods, services and other items which are purchased by cost centers 30 associated with users of system 10. In addition, a general category of goods may be included. (Not explicitly shown) Some of the data could be excluded or other data included without departing from the scope of the invention.

Users of system 10 may comprise a company using system 10 to track expenditures related to the company, a company using system 10 to track expenditures related to the company and one or more subsidiary companies, a company using system 10 to track expenditures for one or more unrelated companies which are cooperating, such as an industry consortium, a third-party tracking expenditures for one or more client companies which have contracted for service from the third-party, and other types of entities and organizations. In general, a user of system 10 may be any organization or group of organizations tracking the expenditures of one or more companies or portions of companies for any reason.

Data preparation application 16 utilizes items 14 stored in GPIR 12 to organize and format items 14 for use by GPIR application 20 and interface 22. More specifically, items 14 received by GPIR 12 may be organized in different formats by different account servers 19 and data preparation application 16 reformats the different formats into either a single format or into one of a plurality of standard formats for use by GPIR application 20 and interface 22. Alternatively, GPIR application 20 and interface 22 could be designed to handle disparate data formats directly. Data preparation application 16 is also operable to reformat information from regional servers 18 into the single format or plurality of standard formats.

Regional servers 18 comprise purchasing information repositories associated with particular geographic regions, particular divisions or subsidiaries of a company, particular facilities of a company, or any other logical division of purchasing information tracking. In one example, the regional purchasing information repositories store accounts payable items 14 for particular geographic areas. For example, a regional server 18 may be associated with Latin America, another with Europe, and a third with Asia. Regional servers 18 utilize one or more server computers to support the purchasing information repositories and communicate accounts payable items 14 to GPIR 12.

Account servers 19 are associated with cost centers 30 and handle items 14 for the associated cost centers 30. Account servers 19 communicate items 14 to GPIR 12 for cost centers 30. Different account servers 19 could also be used for different classes of goods or services, for accounts using different currencies, etc. In other words, different account servers 19 can be used to divide accounts payable tasks into any logical organization.

GPIR application 20 is associated with GPIR 12 and is executed by one or more computers. GPIR application 20 is operable to generate one or more reports in response to accounts payable items 14, sort accounts payable items 14 and perform other operations associated with GPIR 12. An example of GPIR application 20 is described in greater detail in association with FIGS. 2-4. GPIR application 20 may further include vendor alignment tool (VAT) module 23 which is described in more detail in association with FIG. 5.

Web interface 22 comprises a user interface for use by users of system 10 to access GPIR 12 over a World Wide Web (WWW) network connection. In this embodiment, interface 22 supports access and retrieval of data in GPIR 12 using a web browser (not shown). GPIR 12 may be accessed by any method, however, without departing from the scope of the invention.

Communications links 24 may comprise Local Area Networks (LAN), Metropolitan Area Networks (MAN), Wide Area Networks (WAN), the Internet, optical links, satellite links, or other suitable data communications links or networks operable to support communication of data between computer systems.

Cost centers 30 comprise data indicating the department, group, project, or other billing entity which purchased item 14. Note that item 14 can represent a single item or a group of items. Cost 32 comprises an indication of the price of item 14 in a particular currency. Description 36 comprises a description of item 14, such as "pen", "bond paper", "computer monitor", "office supplies" or other textual descriptions appropriate for the item or items in question. Note also that items 14 may comprise purchased services as well. Account 35 indicates the specific budget or purchasing account which paid for item 14.

In operation, account servers 19 and regional servers 18 respectively generate one or more accounts payable items 14. Accounts payable items 14 are then transmitted to GPIR 12 in real time, at random intervals, or at predetermined intervals. In one embodiment, accounts payable items 14 are communicated to GPIR 12 at the end of each business day, but other times may also be set for communication of items 14 to GPIR 12 when communication occurs at predetermined intervals. Where a multinational corporation is involved, communication to GPIR 12 may occur at many different times. Data preparation application 16 reformats items 14 received by GPIR 12. More specifically, various servers 18 and 19 may use different formats for items 14 while GPIR 12 uses a single format or group of formats for storing accounts payable items 14. Data preparation application 16 converts the accounts payable items 14 from the format used by servers 18 and 19 to the format or formats used by GPIR 12. As noted above, such conversion is optional and servers 18 and 19 could communicate items 14 in a recognized format or GPIR 12 could be designed to recognize many different formats.

Figure 2:
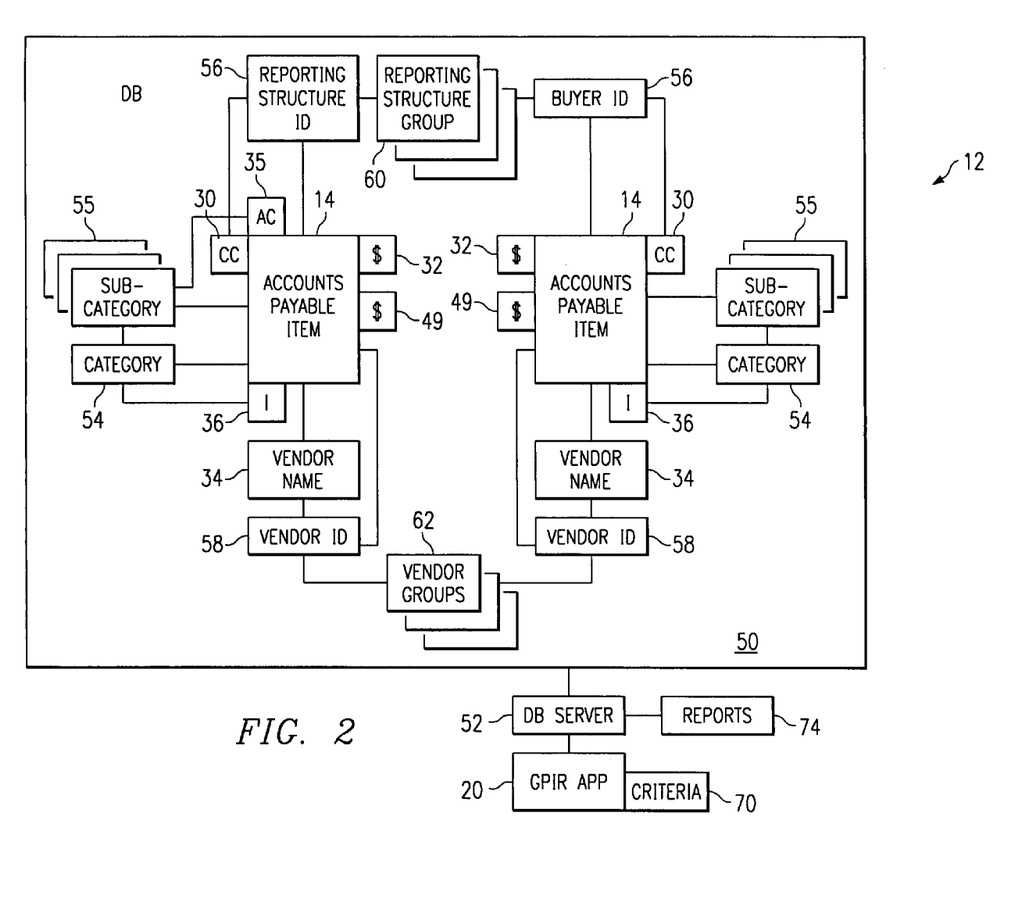
FIG. 2 illustrates further details of the global purchasing information system of FIG. 1.

GPIR application 20 associates a category, a vendor identifier, and a reporting structure identifier with each accounts payable item 14 as described in more detail in association with FIG. 2. GPIR application 20 may also generate various reports, such as an expenditure report, a vendor report and others, in response to accounts payable items 14 which may be sorted by various criteria.

Figure 1A:
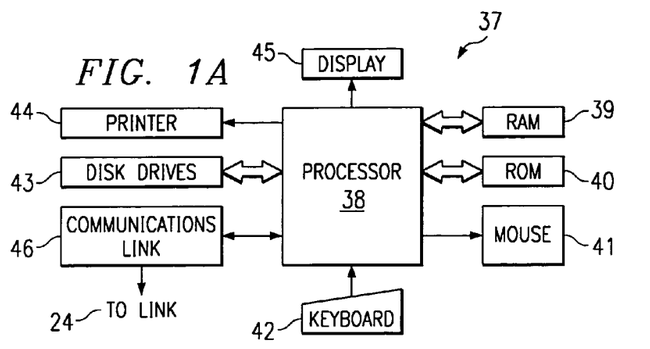
FIG. 1A illustrates one embodiment of a general purpose computer useable with the system of FIG. 1.

FIG. 1A illustrates an embodiment of a general purpose computer 37 that may be used with system 10. More specifically, computer 37 may be used for any of servers 18 and 19, and to support GPIR 12, data preparation application 16 and interface 22. General purpose computer 37 may be adapted to execute any of the well-known MS-DOS, PC-DOS, OS/2, UNIX, MAC-OS, mainframe, minicomputer and Windows operating systems or other operating systems. General purpose computer 37 comprises processor 38, random access memory (RAM) 39, read only memory (ROM) 40, mouse 41, keyboard 42, and input/output devices, such as disk drives 43, printer 44, display 45 and communications link 46. The present invention includes programs that may be stored in RAM 39, ROM 40 or disk drives 43 and may be executed by processor 38. Communications link 46 is connected to link 24 and could be connected via a telephone line, an antenna, a gateway or any other type of communication link. Disk drives 43 may include a variety of types of storage media such as, for example, floppy disk drives, hard disk drives, CD-ROM drives, optical drives or magnetic tape drives. Although one embodiment may employ a plurality of disk drives 43, a single disk drive 43 could be used without departing from the scope of the invention. FIG. 1A only provides one example of a computer 37 that may be used with the invention. The invention could be used on computers other than general purpose computers, as well as on general purpose computers without conventional operating systems.

FIG. 2 is a block diagram of one example embodiment of GPIR 12. GPIR 12 may include a database 50 supported by a database server 52. Database 50 stores accounts payable items 14 and the associated cost center 30, vendor name 34, cost 32, a global company currency 49 and description 36. Database 50 also stores a category 54 and one or more associated subcategories 55, a vendor identifier 58 and a reporting structure identifier 56 associated with items 14. Information about reporting structure groups 60 and vendor groups 62 may also be stored in database 50. A reporting structure group 60 associates groups of reporting structure identifiers 56 and a vendor group 62 associates groups of vendor identifiers 58. Database server 52 comprises any suitable hardware and software operable to support database 50 at GPIR 12. Although this embodiment uses any type of database to store the information, other types of storage could be used such as a flat file. As noted above more or less items of data may be included without departing from the scope of the invention.

Global company currency 49 comprises a representation of cost 32 in a predefined currency. Currency 49 is generated in response to cost 32 using standard currency exchange rate conversion methods. In one embodiment, global company currency 49 comprises U.S. dollars, but any currency may be used.

Category 54 comprises an indication of a category associated with item 14. Category 54 may specify any suitable category desired by a user of GPIR 12. Category 54 may be determined for item 14 in response to description 36. Categories 54 may indicate, for example, computer services, computer equipment and office supplies. Categories 54 thus may be more general descriptions of an item 14 or collection of items 14. Categories 54 may have one or more associated sub-categories.

Sub-category 55 comprises more detailed category information associated with item 14. Sub-categories 55 are associated with categories 54. Sub-categories 55 for an item 14 may be determined in response to account 35 or based on any other criteria, such as human input or description 36. One or more accounts 35 may be associated with sub-categories 55. For example, category 54 may specify "legal services" while one associated sub-category 55 may specify "legal services—patent" and another sub-category may specify "legal services—corporate." For another example, one account 35 may indicate "letterhead laser printer paper" and another account 35 indicate "letterhead copier paper" which may be associated with a sub-category 55 indicating "office supplies—letterhead paper." In general, any organization of categories 54 and sub-categories 55 may be used by a user of system 10.

Reporting structure identifier 56 comprises an integer, alphanumeric or any other type of identifier associated with item 14 based on the cost center 30 associated with item 14. A single reporting structure identifier 56 may be associated with multiple cost centers 30. Also, a single cost center 30 may have multiple associated identifiers 30. In one embodiment, a particular cost center 30 may have one identifier 56 uniquely associated with that particular cost center 30, while other identifiers associated with cost center 30 indicate regional, organizational, departmental and other sets of cost centers 30 to which the particular cost center 30 is related to. For example, a particular cost center 30 may be "Company A Texas" and have a unique associated identifier 56 which identifies the cost center 30 as "Company A Texas." The particular cost center 30 may also have distinct associated identifiers 56 which indicate that "Company A Texas" is a subsidiary of "Company A Southwest", "Company A U.S." and "Company A Worldwide." An organizational chart associated with "Company A Texas" may show that "Company A Texas" is a subsidiary of "Company A Southwest" which is a subsidiary of "Company A U.S." which is a subsidiary of "Company A Worldwide." Thus, five distinct identifiers 56 may be associated with the exemplary "Company A Texas" cost center 30, one identifier 56 indicating the cost center itself, and other identifiers indicating other, more general business units which "Company A Texas" belongs to. The other business units are not restricted to owner/subsidiary relationships and may comprise any business relationship, such as departments and divisions within a company. The multiple identifiers 56 provide the capability to group cost centers 30 in numerous ways in response to the business needs of a user of system 10. In general, one or more identifiers 56 may be associated with a particular cost center 30 indicating any organizational or other structure used by a user of system 10. Any number of identifiers 56 may be associated with an item 14.

Reporting structure group 60 comprises data or a data structure for grouping one or more reporting structure identifiers 56. Groups 60 may indicate associations between cost centers or reporting structure identifiers 56 other than those indicated by identifiers 56. For example, multiple unrelated cost centers 30 may be grouped by their associated identifiers 56 into a "technology buying group." Groups 60 may be used to group cost centers 30 when details are not important. For example, if a business has ten cost centers 30 for different types of legal work, but only wants to see the total amount spend on all legal work, the legal cost centers 30 may be grouped into a legal group 60. Buying groups 60 may also usefully pool their buying power to obtain better prices for goods and services. The invention facilitates group purchasing by allowing data to be aggregated for an entire reporting structure group 60. Groups 60 may be used by a user of system 10 to organize and relate groups of identifiers 56 in response to the business information needs of the user of system 10.

Vendor name 34 comprises an alphanumeric indication of the name of the vendor associated with item 14. Vendor identifier 58 comprises an integer, alphanumeric value or any other type of identifier for identifying vendor name 34. Vendor identifier 58 may be associated with multiple vendor names 34. Also, multiple vendor identifiers 58 may be associated with a single vendor name 34. In one embodiment, a particular vendor name 34 may have one identifier 58 uniquely associated with that particular vendor name 34, while other identifiers associated with vendor name 34 indicate regional, organizational, departmental, subsidiary, ownership, joint venture, partnership and other sets of vendor names 34 to which the particular vendor name 34 is related to or owned by. For example, a particular vendor name 34 may be "Company B Texas" and have a unique associated identifier 58 which identifies the vendor name 34 as "Company B Texas." The particular vendor name 34 may also have associated identifiers 58 which indicate that "Company B Texas" is owned by "Company B Southwest" which is owned by "Company B U.S." which is owned by "Company B Worldwide." An organizational chart associated with "Company B Texas" may show that "Company B Texas" is a subsidiary of "Company B Southwest" which a subsidiary of "Company B U.S." which a subsidiary of "Company B Worldwide." Thus, five distinct identifiers 58 are associated with the exemplary "Company B. Texas" vendor name 34, one identifier 58 indicating the vendor name 34 itself, and other identifiers indicating other business units which "Company B Texas" belongs to. The multiple identifiers 58 provide the capability to group vendor names 34 in numerous ways in response to the business needs of a user of system 10. In general, one or more identifiers 58 may be associated with a particular vendor name 34 indicating any organizational or other structure associated with the vendors with whom a user of system 10 deals.

This feature of the invention facilitates an examination of the total goods and services purchased from a group of related vendors. A cost center 30, user of system 10, purchaser or reporting structure group 60 may use such information to bargain for better pricing or service. Any number of identifiers 58 may be associated with an item 14.

Vendor group 62 comprises an integer, alphanumeric or any other type of identifier for grouping multiple vendor identifiers 58. Vendor groups 62 may organize vendor identifiers 58 which have no significant business relationship, but are related in some other way. For example, vendor groups 62 may associate vendor identifiers 58 of vendors in the same industry, geographic location or based on other criteria. Groups 62 may also be used to group vendors when details regarding the vendors are not important. For example, if a business has ten vendors providing different types of legal work, but only wants to see the total amount spent on all legal work, the vendors providing legal services may be grouped into a legal services group 62. This feature of the invention may facilitate an examination of the total goods and services purchased from vendors based on industry, type of good or service or other criteria. A cost center 30, user of system 10, purchaser or purchasers may use such information to bargain for better pricing.

In operation, GPIR application 20 uses criteria 70 to determine how to associate items 14 with one or more categories 54, sub-categories 55, reporting structure identifiers 56, and vendor identifiers 58. GPIR application 20 also uses criteria 70 to determine the associations between vendor names 34 and vendor identifiers 58, between vendor identifiers 58 and vendor groups 62, between cost centers 30 and reporting structure identifiers 56, and between reporting structure identifiers 56 and reporting structure groups 60. Criteria 70 comprises information used to generate relationships between names 34, identifiers 58, cost centers 30, identifiers 56 and 58, and groups 60 and 62 from any source. For example, criteria 70 may be generated by a user of system 10 to represent business information associated with the user.

Category 54, sub-categories 55 and items 14 may be associated using information about item 14 in description 36. For example, categories 54 may include office supplies, consulting services, and computer equipment while sub-categories 55 may include "office supplies—pens", "consulting services—legal" and "computer equipment—monitors." Criteria 70 may associate items 14 which are accounts payable items for hard drives with the computer equipment category 54 and "computer equipment—hard drives" sub-category 55 while paper clips and pens are associated with the office supplies category 54 and the respective sub-categories 55 "office supplies—pens" and "office supplies—paper clips." In general, using the information about item 14 provided by description 36, criteria 70 may specify any number of categories 54, sub-categories 55 and the association between the categories 54 and sub-categories 55, and items 14. Users of system 10 may establish such criteria.

Reporting structure identifier 56 and one or more cost centers 30 may be associated in order to organize cost centers 30. More specifically, particular departments and other parts of a corporation using system 10 may include multiple cost centers 30 which are organized along different lines. For example, a single corporation may have acquired two other corporations which are now regarded by the acquiring corporation as only two cost centers 30 while the acquired corporations consider themselves as multiple cost centers. Reporting structure identifier 56 may be associated with multiple cost centers 30 and multiple identifiers 56 may be associated with a single cost center 30 in order to logically organize cost centers 30.

Reporting structure group 60 may be used to organize one or more reporting structure identifiers 56. Particular reporting structure identifiers 56 may be associated with multiple reporting structure groups 60. For example, all of the reporting structure identifiers 56 associated with cost centers 30 in a particular geographic area may be grouped into one reporting structure group 60. For another example, reporting structure identifiers 56 associated with particular types of cost centers, such as legal departments, may be associated into a reporting structure group 60 associated with legal services.

Vendor identifier 58 may be associated with one or more vendor names 34 and one or more vendor identifiers 58 may be associated with a single vendor name 34. More specifically, vendor identifier 58 provides for the logical organization of multiple vendor names 34 into a single logical entity so as to more conveniently handle multiple vendor names 34 which are related or associated with each other. Also, multiple identifiers 58 may be associated with single vendor names 34 to identify hierarchical relationships between the vendor name 34 and other vendor names 34. For example, a first vendor name has an associated first vendor identifier, and a second vendor name has a distinct associated second vendor identifier. Also, the first vendor is a subsidiary of a second vendor. The first vendor name may have both the first and second vendor identifiers associated with the first vendor name to indicate that the first vendor name is a subsidiary of the second vendor name. The second vendor name could have only the second vendor associated with it because the second vendor is not a subsidiary of the first vendor. For another example, a single vendor may comprise multiple subsidiary corporations with distinct vendor names 34 while a user associated with system 10 may associate a single vendor identifier 58 with all the vendors names 34 associated with a single actual business.

Vendor groups 62 may be associated with one or more vendor identifiers 58 in order to provide more convenient organization of vendor identifiers 58. Particular vendor identifiers 58 may be associated with multiple vendor groups 62. For example, vendor groups 62 may organize vendor identifiers 58 by industry, cost center, and other suitable criteria. Vendor groups 62 may also be used to group vendor names when details of the vendor names are unimportant.

System 10 provides the capability to generate business information regarding expenditures for businesses. The business information may be used to assist the business in decreasing expenditures, identifying waste, and negotiating with vendors.

System 10 supports the collection and organization of accounts payable items 14 for a plurality of regions and cost centers associated with one or more businesses. A business may use system 10 to generate a report 74 indicating expenditures and the report may be organized by various information depending on the business need of the business.

For example, reports 74 may be generated which are organized by reporting structure identifiers 56. In this example, a first reporting structure identifier is associated with "Purchaser A Texas" and a second reporting structure identifier is associated with "Purchaser A Southwest" wherein each of the first and second reporting structure identifiers are distinct. A first report is generated which is organized by the first reporting structure identifier and a second report is generated which is organized by the second reporting structure identifier. Using these reports, a user of system 10 could determine that the cost center "Purchaser A Southwest" is spending too much and targets "Purchaser A Southwest" for cost reduction efforts. Other reports 74 may then be generated for the vendor identifiers 58 associated with the second reporting structure identifier which has been targeted for cost reduction efforts. In order to determine possible cost savings measures, other reports 74 may be generated based on vendors associated with "Purchaser A Southwest," as well as related companies to "Purchaser A Southwest" that may pool their purchasing power.

Continuing the above example, respective first and second vendor identifiers may be associated with "Texas Services" and "Texas Supplies," and a third and fourth vendor identifier may be associated with "Southwest Industries" which owns both "Texas Supplies" and "Texas Services." Both "Texas Services" and "Texas Supplies" are also associated with the third vendor identifier because "Texas Supplies" and "Texas Services" are subsidiaries to "Southwest Industries." The fourth vendor identifier may identify "Southwest Industries" uniquely. Reports 74 generated for "Purchaser A Southwest" may show that "Purchaser A Southwest" purchases from many vendors including "Southwest Industries," "Texas Supplies" and "Texas Services," but that none of these expenditures are particularly significant standing alone. However, the reports 74 may show that total expenditures to "Southwest Industries" and its subsidiaries are significant. The user of system 10 may then use reports 74 to determine that significant savings may be realized by negotiating discounts with "Southwest Industries" due to is aggregate purchases from "Southwest Industries" and its related companies.

Continuing to use the above example, a report 74 of the total expenditures by "Purchaser A Southwest" excluding the expenditures of "Purchaser A Texas" may be generated for a user of system 10. In one embodiment, the report may be generated by first finding all items 14 having the second reporting structure identifier indicating "Purchaser A Southwest" and placing them in a set. However, since items 14 associated with "Purchaser A Texas" also have the second reporting structure identifier associated with them, application 20 would then remove items 14 in the set which have the first reporting structure identifier associated with them. The set would then contain items 14 which have only the second reporting structure identifier associated with them.

In one embodiment, reporting structure identifiers 56 may be associated with each relationship between cost centers 30. In this embodiment, and using the above example, a third reporting structure identifier would be associated with the relationship between "Purchaser A Southwest" and "Purchaser A Texas." Items 14 associated with "Purchaser A Texas" would then have the first reporting structure identifier 56 associated with them to uniquely identify the purchasing cost center 30, and would have the reporting structure identifiers 56 associated with each relationship between "Purchaser A Texas" and related cost centers, such as "Purchaser A Southwest," instead of having the reporting structure identifier 56 associated with "Purchaser A Southwest" associated with the items 14. Similarly, a vendor identifier 58 would be associated with each relationship between vendors.

In general, reports 74 may aggregate data for any combination of cost centers 30, identifiers 56, groups 60, categories 54, sub-categories 55 on the purchasing side over any specified date range. This capability may be used to generate reports 74 indicating expenditures across, for example, the five cost centers making up a single facility in order to negotiate price discounts for that facility. For example, if reporting structure identifiers are organized to group facilities, and groups 60 of facilities are created for each region of facilities, then a report 74 may be generated showing expenditures on a regional basis. Categories 54 and sub-categories 55 may be used to view expenditures across particular product lines. For example, reports 74 may be generated for a sub-category such as "Office supplies—letterhead laser printer paper" for all items 14 in that sub-category purchased by cost centers 30 associated with a particular group 60 or regional cost center using identifiers 58. This flexibility allows a user of system 10 to generate reports at numerous levels of detail covering numerous different combinations of items 14.

Reports 74 may also aggregate data for any combination of cost centers 30, identifiers 58, groups 62, categories 54, sub-categories 55 on the vendor side over any specified date range. This capability may be used to generate reports 74 indicating expenditures across, for example, the five vendors supplying the category 54 of "Office supplies" to the ten cost centers 30 making up a reporting structure group 60 for the Texas region of a particular company. Categories 54 and sub-categories 55 may be used to view expenditures across numerous vendors at various business levels. For example, a report 74 may be generated that indicates expenditures for sub-category 55 of "Computer equipment—keyboards" showing all vendors for all cost centers 30. The report may show that while cost centers 30 individually spend small amounts on keyboards, that the company as a whole may spend significant amounts on keyboards. The report may also show that the amount spent on keyboards is being spread amount six vendors. A user of system 10 may use this information to negotiate a a price discount from one or more of the keyboard vendors for particular cost centers 30 and/or the company as a whole.

In addition, any of the previously described reports 74 may be presented in the global company currency 49 or the local currencies originally associated with items 14. This provides flexibility to users of system 10 who are in different countries, but are still part of the same company. The capability to handle multiple currencies may allow users of system 10 to negotiate with local vendors using the local currency, and global vendors using the global company currency 49. In addition, any combination of any of the above data may be used with reports 74. Further, reports 74 may be sorted by any of the above data and may be sorted multiple times, for example, a first sort by categories 54 and then sorting within the categories 54 by vendor identifiers 58.

For another example, by generating a report 74 sorted by vendor groups 62, a business may determine that a total of $2 million per year is being spent on computer consulting services from three vendors. The business may then use this information to negotiate a discount from one of the three vendors to provide all of the $2 million of services for $1.5 million. The business may use report 74 to leverage the business's buying power to negotiate discounts and other arrangements with vendors.

Figure 3:
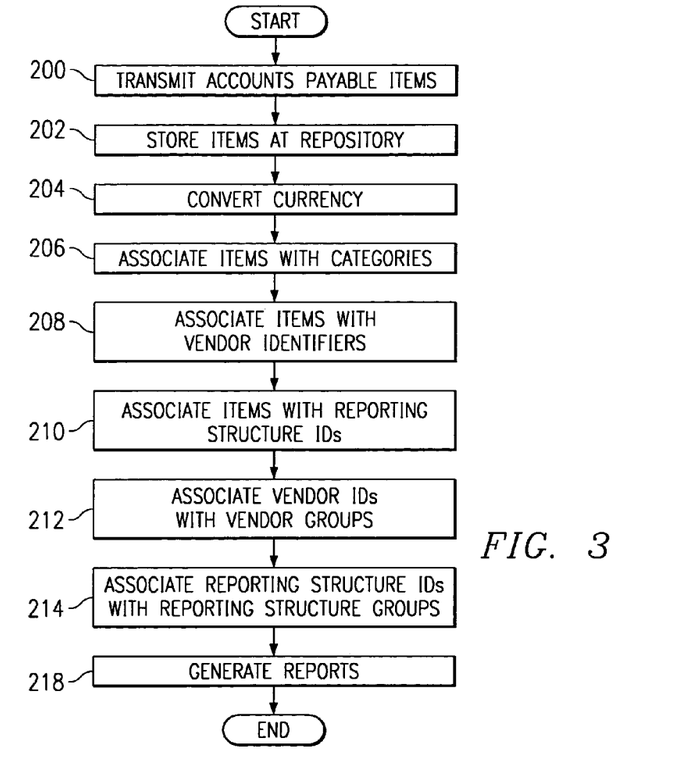
FIG. 3 is a flow chart illustrating one example of a method for tracking purchasing information.

FIG. 3 is a flow chart illustrating one example of the use of system 10. The method begins at step 200 where accounts payable items 14 are transmitted to GPIR 12 from servers 18 and 19. Then, at step 202, items 14 are stored at GPIR 12. Proceeding to step 204, the currency associated with cost 32 may be converted to a predetermined global company currency 49. The currencies are converted to currency 49 in order to simplify the handling of items 14 and to allow for direct comparison of cost 32 between items 14 purchased in different currencies. In some embodiments, this step can be omitted where items 14 already use a common currency. In general, both the original currency and currency 49 are stored with items 14 so that reports may be generated in either of the two currencies.

For example, a regional subsidiary of a multinational corporation may generate items 14 in a local currency and generate reports in the local currency. However, the headquarters of the multinational corporation may use a different currency 49 as the global company currency. As system 10 supports both the local currency and currency 49, both the headquarters and the regional subsidiary may work with items 14 in their preferred currency. For multinational corporations with multiple regional or country specific subsidiaries with distinct currencies, the headquarters may use system 10 to review all expenditures in the global company currency 49, while the subsidiaries continue to use their local currency.

At step 206, items 14 are associated with categories 54 and sub-categories 55. More specifically, criteria 70 is used to determine relationships between ones of items 14 and one or more categories 54 and one or more sub-categories 55 based on details 36 associated with item 14. For example, if details 36 indicates that item 14 is a computer monitor then item 14 may be associated with the information technology category, the "information technology—monitor" sub-category, the office supplies category, and the "office supplies—computer equipment" sub-category. In general, criteria 70 may indicate any association of items 14 with categories 54 and sub-categories 55 based on description 36. Categories 54 and sub-categories 55 may also be manually assigned by a user of system 10.

Then, at step 208, items 14 are associated with vendor identifiers 58. Items 14 are associated with vendor identifiers 58 based on criteria 70. More specifically, the vendor name 34 associated with item 14 may be used to determine which vendor identifiers 58 to associate with item 14. Associating vendor identifiers 58 with item 14 provides increased ease in determining the vendors associated with item 14. In one embodiment, a Dun and Bradstreet report may be used to determine hierarchical and ownership relationships between vendor names 34 and vendor identifiers 58 so that vendor identifiers 58 associated with parent and/or subsidiary vendors of vendor name 34 are associated with item 14. For example, a large vendor may use multiple subcompanies to provide different types of items and services, such as "company A consulting" and "company A supplies". One vendor identifier may be used to indicate that the two company names, "company A consulting" and "company A supplies", are actually only one vendor. Also, multiple vendor identifiers 58 may be used to indicate that "company A consulting" is a subsidiary of "company A industries" by also associating the vendor identifier 58 associated with "company A industries" with item 14.

Then, at step 210, items 14 are associated with reporting structure identifiers 56. Based on criteria 70 and cost center information 30, items 14 are associated with reporting structure identifiers 56. More specifically, for accounting or other purposes, the purchaser of item 14 may be indicated by reporting structure identifier 56. One reporting structure identifier 56 may be associated with multiple cost centers 30 based on criteria 70. Multiple reporting structure identifiers 56 may also be associated with item 14 to indicate the relationship of the cost center 30 associated with item 14 to other cost centers 30 and business divisions.

Proceeding to step 212, vendor identifiers 58 are associated with vendor groups 62. For example, a vendor identifier 58 indicating company A which sells both office supplies and computer consulting services, may be associated with two vendor groups 62, one vendor group 62 for consulting companies and another vendor group 62 for office supply companies. Next, at step 214, reporting structure identifiers 56 may be associated with reporting structure groups 60. Groups 60 and 62 may then be used, for example, to determine total expenditures for the groups 60 and 62.

At step 218, one or more reports 74 may be generated. Reports 74 are generated in response to requests from users of system 10. More specifically, reports 74 are based on information in database 50 and may comprise one or more items 14 (or data aggregating multiple items 14) and any combination of the associated vendor name 34, vendor identifier 58, cost center 30, cost 32, description 36, category 54, sub-category 55 and reporting structure identifier 56. Reports 74 may be sorted by any of the elements included in report 74.

Reports 74 may be used to negotiate with vendors. For example, if report 74 is sorted by vendor identifier 58 and shows that large numbers of purchases are made from a single vendor, the report may be used to negotiate price concessions from the vendor. Such negotiations could be done by a buying group, an organization or subset of an organization. In addition, if vendor identifier 58 is associated with a plurality of related vendors in a vendor group 62, report 74 may reveal that while relatively small amounts are spent with individual vendors, as a group the vendors provide a large amount of items and services. With the additional knowledge provided by reports 74, the user may be able to acquire significant price discounts from the vendors as a group. In general, reports 74 may be sorted, categories 54 and sub-categories 55 determined, identifiers 56 and 58 assigned and groups 60 and 62 determined in any way to provide users of system 10 with knowledge of expenditures associated with items 14 with respect to vendors.

Reports 74 may also be used to analyze expenditures. For example, by sorting report 74 by category, the total expenditures for one or more cost centers 30 in a particular category may be determined. For another example, a user of system 10 with many cost centers 30 may use reports 74 to determine that duplicative services are being purchased by cost centers 30. For yet another example, cost centers 30 which are spending more than other comparable cost centers 30 may be monitored to determine why the higher expenditures are occurring. In general, reports 74 may be sorted, categories 54 determined, groups 60 and 62 determined in any suitable way to provide users of system 10 with knowledge of expenditures associated with items 14 and cost centers 30.

Figure 4:
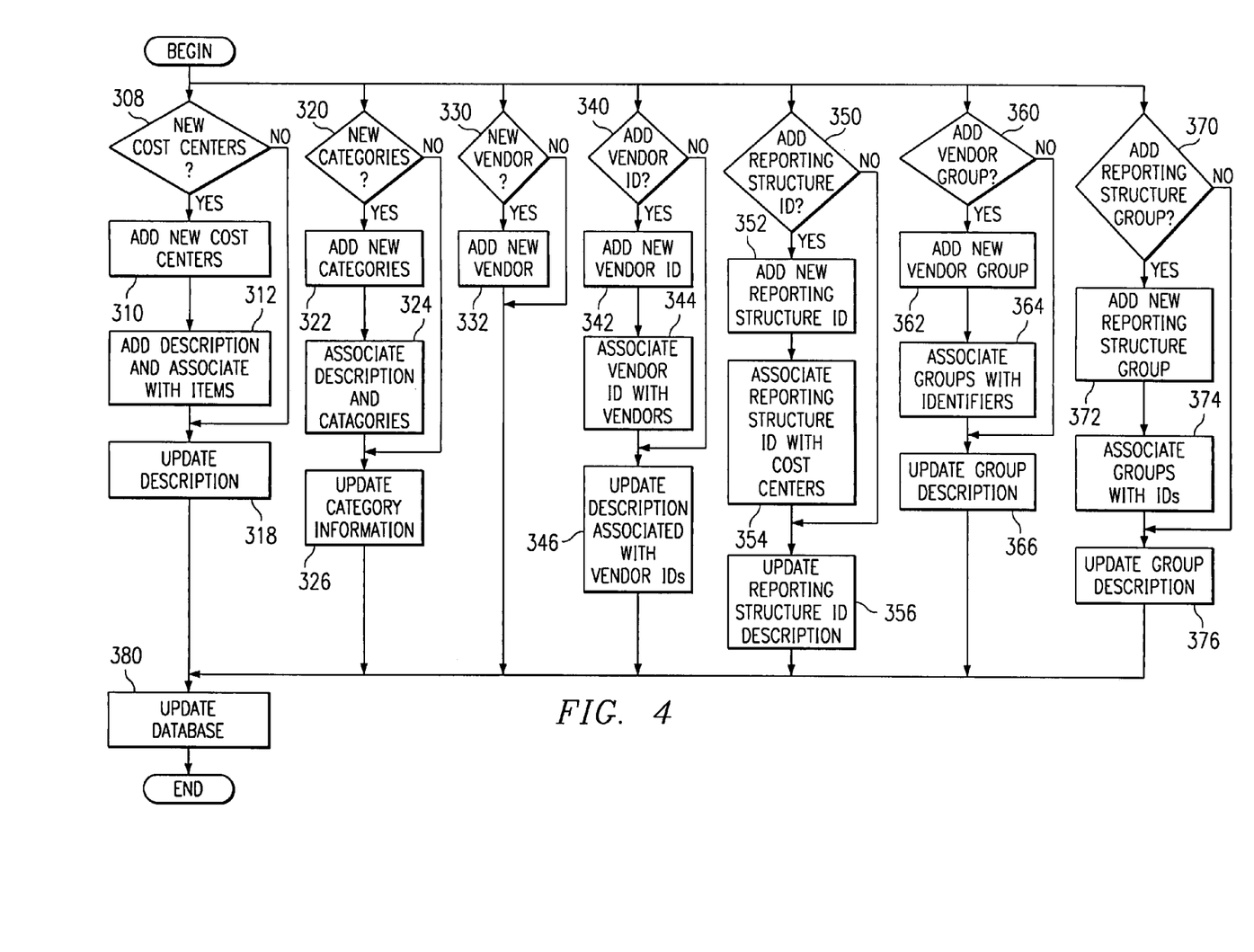
FIG. 4 is a flow chart illustrating details of one example method of configuring the system of FIG. 1.

FIG. 4 is a flow diagram illustrating a method of configuring system 10. At decisional step 308, new cost centers 30 may be added to GPIR 12 by a user associated with system 10 and administrators associated with servers 18 and 19. New cost centers 30 may be added to account for new divisions, acquisitions, mergers, projects and other events associated with the user of system 10. New cost centers 30 may be added prospectively (before items 14 associated with the new cost center are received by GPIR 12), or retroactively (after items 14 associated with the new cost center are received by GPIR 12) where already received items 14 may then be associated with the new cost center. If no new cost centers 30 are to be added, then the NO branch of decisional step 308 is followed to step 318. If new cost centers 30 are to be added then the YES branch of decisional step 308 leads to step 310. At step 310, new cost centers 30 are added to GPIR 12 using a user interface (not explicitly shown) and, at step 312, a description may be associated with the new cost center 30. Also at step 310, items 14 already communicated to GPIR 12 may be associated with the new cost center 30. Proceeding to step 318, existing descriptions associated with cost centers 30 may be updated to represent changes associated with cost centers 30.

At decisional step 320, which follows from step 306, new categories 54 and sub-categories 55 may be added n response to new accounts 35. New categories and sub-categories may be added to provide new perspectives on existing items 14 and accounts 35, to handle new types of accounts 35 and for any other reason. In one embodiment, new categories and sub-categories are added in response to new accounts 35 associated with items 14. New categories 54 and sub-categories 55 may also be added prospectively to handle expected new accounts 35. For example, a user of system 10 may switch from internally providing computer support services to using an outside contractor and a new category 54 may be used to reflect external purchases of computer services. Also, a new sub-category 55 may be added to reflect the types of computer services purchased, such as "computer services—network management." If no new categories 54 or sub-categories 55 are to be added, then the NO branch of decisional step 320 leads to step 326. If new categories 54 or sub-categories 55 are to be added, the method proceeds to step 322 where the user of system 10 may add one or more new categories and sub-categories. At step 324, the new categories and sub-categories defined in step 322 may be associated with descriptions 36 so that future items 14 may be associated with the new categories and sub-categories. Items 14 already received at GPIR 12 may also be associated with new categories 54 and sub-categories 55. Then, at step 326, the information associated with the new and existing categories and sub-categories may be updated. For example, a new category of computer services may be added and the information associated with the computer services category may indicate that the category reflects computer expenditures to an outside contractor while an existing computer maintenance category is updated to indicate that the computer maintenance category reflects only internal computer expenditures.

At decisional step 330, which follows from step 306, new vendor names 34 may be added. New vendor names 34 may be added in order to accommodate new suppliers of goods and services. New vendor names 34 may be added manually by a human user of system 10 or automatically by data preparation application 16 when new vendor names 34 are received by GPIR 12 in association with items 14. If no new vendor names are to be added then the NO branch of decisional step 330 leads to step 380. If new vendor names 34 are to be added, then the YES branch of decisional step 330 leads to step 332. At step 332, new vendor names 34 may be automatically added by data preparation application 16. More specifically, data preparation application 16 may add new vendor names 34 in response to items 14 sent to GPIR 12 which have associated vendor names 34 which have not been previously received at GPIR 12. Data preparation application 16 may then add the vendor names 34 to database 50 for association with vendor identifiers 58. Also, a user of system 10 may manually add new vendor names 34 to database 50.

At decisional step 340, which follows from step 306, new vendor identifiers 58 may be added. Vendor identifiers 58 may be added to indicate relationships between vendor names 34, such as when multiple vendor names 34 are related. If no new vendor identifiers 58 are to be added, then the NO branch of decisional step 340 leads to step 346. If new vendor identifiers 58 are to be added, then the YES branch of decisional step 340 leads to step 342. At step 342, new vendor identifiers 58 may be added to database 50 by a user of system 10 using a suitable interface (not shown).

Then, at step 344, ones of the vendor identifiers 58 may be associated with one or more vendor names 34. In one embodiment, external information, such as a Dun and Bradstreet report, may be used to associate vendor names 34 with vendor identifiers 58. As vendor identifiers 58 indicate related vendors with different vendor names 34, the Dun and Bradstreet report may be used to determine the relationships. For example, a single major company may supply goods and services to multiple cost centers 30 associated with a user of system 10 using multiple vendor names 34. Vendor identifiers 58 provide an indication of the relationship between the distinct vendor names 34 so that the actual amount of expenditures related to all or a portion of the single major company. Proceeding to step 346, descriptions associated with new and existing vendor identifiers 58 may be updated to reflect new identifiers 58 and changes in existing identifiers 58.

At decisional step 350, which follows from step 306, new reporting structure identifiers 56 may be added. Reporting structure identifiers 56 may be added to indicate relationships between cost centers 30, such as when multiple cost centers 30 are located at a single geographic location or represent similar departments (such as legal departments), or when multiple cost centers 30 have some ownership or other business relationship. If no new reporting structure identifiers 56 are to be added, then the NO branch of decisional step 350 leads to step 356. If new reporting structure identifiers 56 are to be added, then the YES branch of decisional step 350 leads to step 352. At step 352, new reporting structure identifiers 56 may be added to database 50 by a user of system 10 using a suitable interface (not shown).

Next, at step 354, reporting structure identifiers 56 may be associated with cost centers 30. For example, a single major company may have several cost centers, in a given geographic location. Associating the multiple cost centers 30 with a single reporting structure identifier 56 may allow, for example, multiple expenditures for the same goods and services to be more easily detected. Also, associating multiple identifiers 56 with a single cost center 30 may be used to indicate organizational relationships between the cost centers 30. In one embodiment, cost centers 30 are associated with at least one identifier 56 which uniquely identifies the cost center 30 while other identifiers may optionally be associated with particular cost centers 30 to indicate relationships between the cost centers. In general, any relationship, informational goal or other suitable criteria may be used to determine associations between cost centers 30 and identifiers 56. Proceeding to step 356, descriptions associated with new and existing reporting structure identifiers 56 may be updated to reflect new identifiers 56 and changes in existing identifiers 56.

At decisional step 360, which follows from step 306, new vendor groups 62 may be added. Vendor groups 62 may be added to associate vendor identifiers 58 with each other based on relationships between companies identified by identifiers 58. In contrast to identifiers 58 which typically group vendor names 34 of related vendors, vendor groups 62 typically group vendors by criteria other than whether the vendors associated with identifiers 58 have ownership or business ties. For example, groups 62 may group vendors by industry or size. Groups 62 may also be used when details of vendors are unimportant and only group information is desired. For example, hotel vendors may be placed in a group 62 of hotels because only total hotel expenditures are useful. In general, groups 62 may be used to group vendors associated with identifiers 58 based on any suitable criteria by the user of system 10 in order to organize vendors or gain business insights into how expenditures break down at a higher level than by vendor. In addition, since identifiers 58 may be associated with multiple groups 62, different schemes may be used.

If no new vendor groups 62 are to be added, then the NO branch of decisional step 360 leads to step 366. If new vendor groups 62 are to be added, then the YES branch of decisional step 360 leads to step 362. At step 362, new groups 62 may be added to database 50 by a user of system 10 using a suitable interface (not shown). Then, at step 364, groups 62 may be associated with identifiers 58. Proceeding to step 366, descriptions associated with new and existing vendor groups 62 may be updated to reflect new groups 62 and changes in existing groups 62.

At decisional step 370, which follows from step 306, new reporting structure groups 60 may be added. Reporting structure groups 60 may be added to associate reporting structure identifiers 56 with each other based on relationships between reporting structure identifiers 56. In contrast to identifiers 56 which typically group related cost centers 30, reporting structure groups 60 typically group purchasers by criteria other than whether the purchasers associated with identifiers 56 have geographic or organizational relationships. Similar to vendor groups 62, groups 60 may be used to group cost centers 30 when details are unimportant and only total expenditures are needed. In general, groups 60 are used to group purchasers associated with identifiers 56 based on any criteria in order to organize purchasers or gain business insights into how expenditures break down at a higher level than that provided by the identifiers 56. In addition, since identifiers 56 may be associated with multiple groups 60, different schemes may be used to accomplish different goals.

If no new reporting structure groups 60 are to be added, then the NO branch of decisional step 370 leads to step 376. If new reporting structure groups 60 are to be added, then the YES branch of decisional step 370 leads to step 372. At step 372, new groups 60 may be added to database 50 by a user of system 10 using a suitable interface (not shown). Then, at step 374, groups 60 may be associated with identifiers 56. Proceeding to step 376, descriptions associated with new and existing vendor groups 60 may be updated to reflect new groups 60 and changes in existing groups 60.

Next, at step 380, database 50 is updated with any changes. The method then ends.

Figure 5:
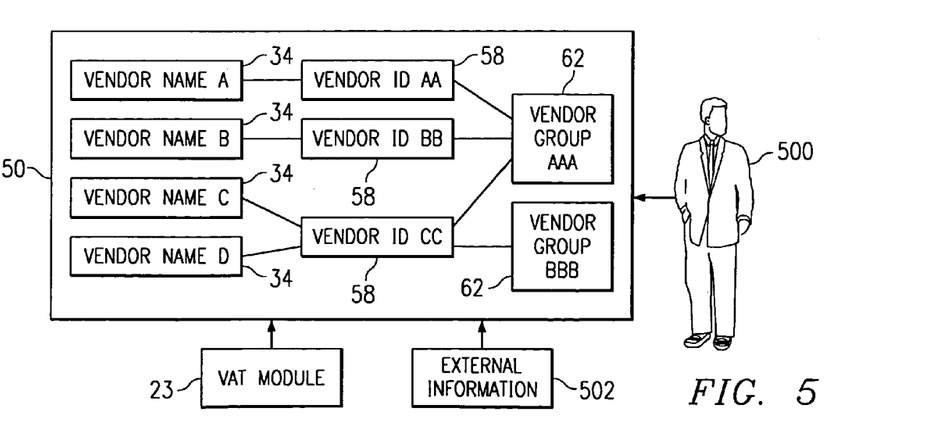
FIG. 5 illustrates a vendor alignment tool module that may be used in one embodiment of the invention.

FIG. 5 is a block diagram illustrating one example of a VAT module 23. Module 23 operates to associate vendor names 34 with vendor identifiers 58 and identifiers 58 with groups 62. Module 23 may perform the associations manually in response to human input 500 or automatically in response to external information 502. External information 502 may comprise any suitable information indicating relationships between names 34 and identifiers 58. For example, a Dun and Bradstreet report may comprise external information 502 indicating ownership relationships between vendor names 34.

An example is presented in FIG. 5 to more clearly illustrate the operation of module 23. Vendor name "A" is associated with vendor identifier "AA", vendor name "B" is associated with vendor identifier "BB", and vendor names "C" and "D" are associated with vendor identifier "CC". Vendor names "A" and "B" represent distinct companies with no significant ownership or other business relationship. Vendor names "C" and "D" are distinct from "A" and "B", but are related to each other, such as being owned by a common parent company or "C" owning "D" as a subsidiary. Vendors "A" and "B" receive separate identifiers because they are not significantly related to each other, while "C" and "D" receive a single identifier because they are related.

Vendor group "AAA" is associated with identifiers "AA", "BB", and "CC" because, while vendors "A", "B", and "C" and "D" may not have a business relationship, they are all associated with the same industry. Vendor group "AAA" may represent the computer consulting industry. Vendor group "BBB" is associated with only identifier "CC". Group "BBB" may represent the computer hardware industry and identifier "CC" represents a company or companies, such as "C" and "D" who perform both computer consulting services and computer hardware, while identifiers "AA" and "BB" provide only computer consulting services.

In general, any suitable associations between identifiers 58, names 34 and groups 62 may be created by users 500 based on business goals, information need or other criteria. This flexibility allows users of system 10 to create and utilize numerous relationships between vendors in order to more clearly determine expenditures by the users of system 10 or clients of users of system 10.

Figure 6:
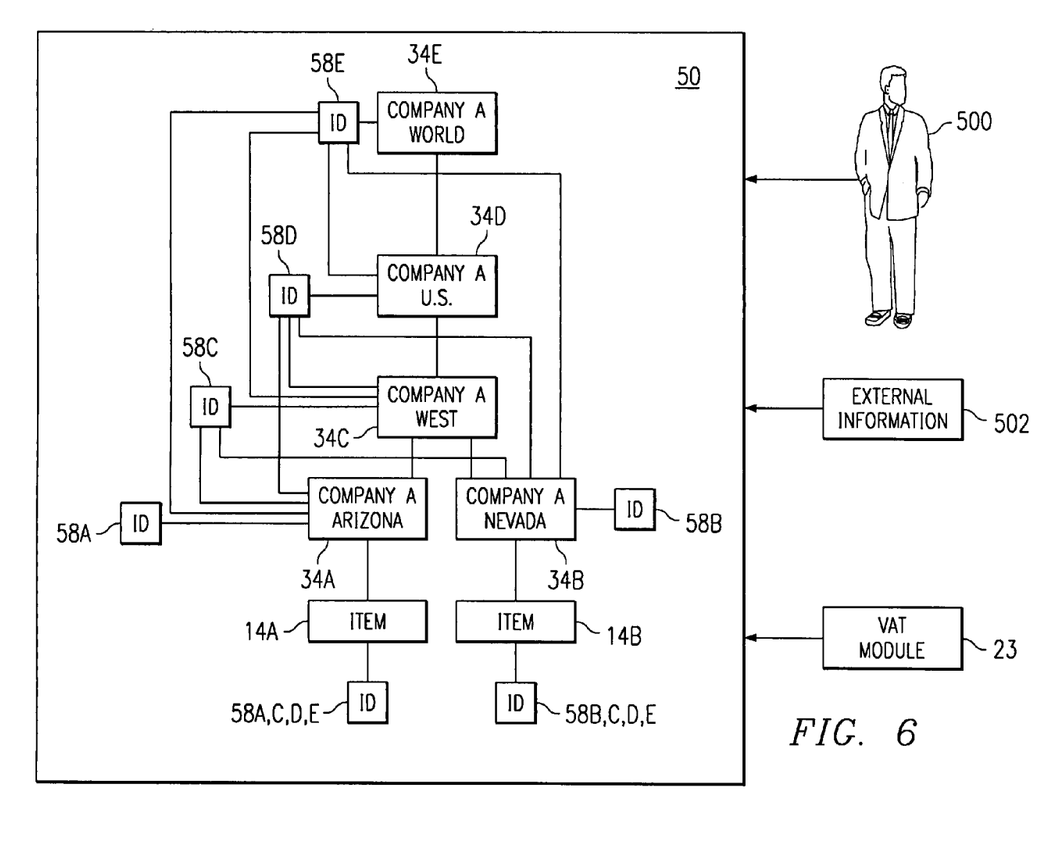
FIG. 6 is a block diagram illustrating an example of the operation of the vendor alignment tool module of FIG. 5.

FIG. 6 is a block diagram illustrating another example of VAT module 23. Module 23 also operates to associate vendor identifiers 58 with items 14. Module 23 may perform the associations manually in response to human input 500 or automatically in response to external information 502. In this example, a first item 14A and a second item 14B are respectively associated with vendor names 34A and 34B. Vendor names 34A and 34B have respective unique vendor identifiers 58A and 58B. Vendor name 34C owns both 34A and 34B and has an associated unique identifier 58C. Vendor name 34D owns 34C and has an associated unique identifier 58D. Vendor name 34E owns 34D and has an associated unique identifier 58E.

VAT module 23 uses the relationships between 34A-E to associate identifiers 58A, 58C, 58D and 58E with item 14A and identifiers 58B, 58C, 58D and 58E with item 14B. For example, VAT module 23 may use external information 502, such as a Dun & Bradstreet report, to determine the relationships between 34A-E. Human input 500 may also be used to determine the relationships between 34A-E.

Item 14A is initially associated with vendor name 34A when received at GPIR 12. VAT module 23 then A determines that vendor name 34A is owned by the vendor name 34C, which is owned by 34D which is owned by 34E. Identifier 58A is associated with item 14A because vendor name 34A is associated with item 14A. Identifiers 58C-E may be further associated with item 14A because vendor name 34A is owned by 34C-E. Similarly, identifiers 58B-E may be associated with item 14B because vendor name 34B is owned by 34C-E.

In the embodiment where each relationship between vendors is associated with a vendor identifier 58, further vendor identifiers 58 would be associated with each relationship between 34A-E. For example, item 14A would have identifier 58A associated with it to identify "Company A Arizona" as the vendor for item 14A. Item 14A would then have distinct identifiers 58 associated with it indicating the relationship between 34A and 34C, 34A and 34D, and 34A and 34E.

It should also be recognized that other changes, substitutions and alterations are also possible without departing from the spirit and scope of the present invention, as defined by the following claims.

What is claimed is:

1. A method for organizing vendor information comprising:

receiving data comprising a plurality of accounts payable items, each accounts payable item having an associated first vendor name and an associated cost in a local currency, wherein the vendor name represents a business associated with a purchase transaction represented by the accounts payable item, and wherein at least one of the accounts payable items has a local currency that is different from that of at least one of the other accounts payable items;

associating a first vendor identifier and a second vendor identifier using a computer for each of the accounts payable items, wherein the first vendor identifier uniquely identifies a first vendor associated with the first vendor name and the second vendor identifier indicates an organizational business relationship between the first vendor and one or more other vendors;

converting the associated costs of each of the accounts payable items from the local currency to a global currency;

calculating a purchasing total for each first vendor name expressed in the global currency by adding the converted associated costs for each of the accounts payable items; and determining the total expenditure for each vendor associated with said accounts payable items using the plurality of accounts payable items, the first vendor identifier, the second vendor identifier, and the purchasing total for each first vendor name.

2. The method for organizing vendor information according to claim 1, wherein the relationship is any of a subsidiary relationship, a joint venture relationship, a partnership relationship or an ownership relationship.

3. The method for organizing vendor information according to claim 1, wherein the first vendor identifier and second vendor identifier are associated with ones of the items in response to the first vendor name.

4. The method for organizing vendor information according to claim 3 further comprising maintaining a database associating one or more vendor identifiers with the first vendor name.

5. The method for organizing vendor information according to claim 4, wherein the database was at least partially created in response to a database describing relationships between a plurality of vendor names.

6. The method for organizing vendor information according to claim 4, wherein the database was created at least partially in response to relationships between vendors defined by a user of computer software associated with the database.

7. The method for organizing vendor information according to claim 1 further comprising associating a plurality of vendor identifiers with a vendor group.

8. The method for organizing vendor information according to claim 7, wherein the vendor group comprises a plurality of vendors with a common characteristic selected from the group consisting of an industry, a product, an ownership relationship, a strategic alliance, and a joint venture.

9. The method for organizing vendor information according to claim 1 further comprising associating a third vendor identifier with ones of the accounts payable items indicating the relationship between the vendors associated with the first and second vendor identifiers.

10. A system for organizing vendor information comprising:

a computer readable storage medium;

software stored on said storage medium operable to:

receive data comprising a plurality of accounts payable items, each accounts payable item having an associated first vendor name and an associated cost in a local currency, wherein the vendor name represents a business associated with a purchase transaction represented by the accounts payable item, and wherein at least one of the accounts payable items has a local currency that is different from that of at least one of the other accounts payable items;

associate a first vendor identifier and a second vendor identifier using a computer for each of the accounts payable items, wherein the first vendor identifier uniquely identifies a first vendor associated with the first vendor name and the second vendor identifier indicates an organizational business relationship between the first vendor and one or more other vendors;

convert the associated costs of each of the accounts payable items from the local currency to a global currency;

calculate a purchasing total for each first vendor name expressed in the global currency by adding the converted associated costs for each of the accounts payable items; and determine the total expenditure for each vendor associated with said accounts payable items using the plurality of accounts payable items, the first vendor identifier, the second vendor identifier, and the purchasing total for each first vendor name.

11. The system for organizing vendor information according to claim 10, wherein the relationship is any of a subsidiary relationship, a joint venture relationship, a partnership relationship or an ownership relationship.

12. The system for organizing vendor information according to claim 10, wherein the first vendor identifier and second vendor identifier are associated with ones of the items in response to the first vendor name.

13. The system for organizing vendor information according to claim 12, wherein the software is further operable to maintain a database associating one or more vendor identifiers with the first vendor name.

14. The system for organizing vendor information according to claim 13, wherein the database was at least partially created in response to a database describing relationships between a plurality of vendor names.

15. The system for organizing vendor information according to claim 13, wherein the database was created at least partially in response to relationships between vendors defined by a user of computer software associated with the database.

16. The system for organizing vendor information according to claim 10, wherein the software is further operable to associate a plurality of vendor identifiers with a vendor group.

17. The system for organizing vendor information according to claim 16, wherein the vendor group comprises a plurality of vendors with a common characteristic selected from the group consisting of an industry, a product, an ownership relationship, a strategic alliance, and a joint venture.

18. The system for organizing vendor information according to claim 10, wherein the software is further operable to associate a third vendor identifier with ones of the accounts payable items indicating the relationship between the vendors associated with the first and second vendor identifiers.

* * * * *